(No Model.)

B. G. FITZHUGH.
Car Starter.

No. 234,121.  Patented Nov. 9, 1880.

Witnesses,
W. A. Bertram,
John C. Gittinger.

Inventor,
B. G. FITZHUGH
by N. D. Williams,
Attorney.

United States Patent Office.

BENJAMIN G. FITZHUGH, OF BALTIMORE, MARYLAND, ASSIGNOR OF ONE-HALF TO PHILIP CRIST, OF SAME PLACE.

CAR-STARTER.

SPECIFICATION forming part of Letters Patent No. 234,121, dated November 9, 1880.

Application filed August 6, 1880. (No model.)

*To all whom it may concern:*

Be it known that I, BENJAMIN G. FITZHUGH, of Baltimore city, State of Maryland, have invented certain new and useful Improvements in Car-Starters; and I hereby declare the same to be fully, clearly, and exactly described as follows, reference being had to the accompanying drawings, in which—

Figure 1:
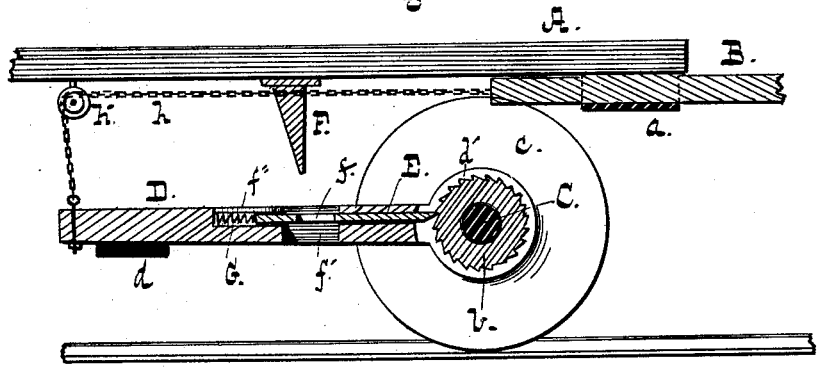
Figure 2:
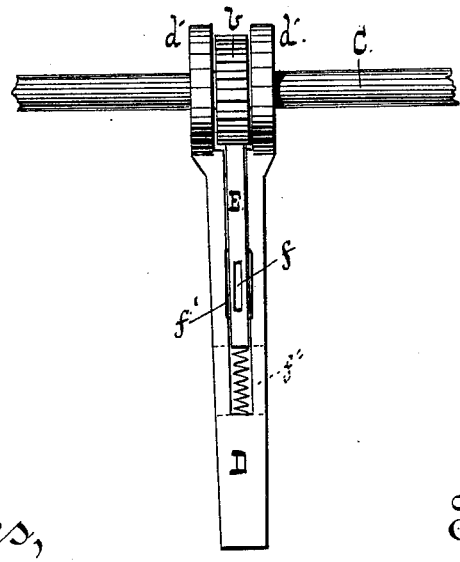

Figure 1 is a central sectional view of that part of a car embodying the elements to which my invention relates, and Fig. 2 is a plan of the same.

My invention has reference to devices for facilitating the starting of that class of vehicles in general in which the wheels are rigidly secured to the axles.

Much difficulty has heretofore been experienced in starting heavily-laden vehicles of this class, and especially in starting street-railway cars in cities, and various devices have been proposed to obviate the difficulty, but they have all been open to some objection which has prevented them from coming into general use.

I have devised a starter which is simple, efficient, and may readily be applied to cars already in use. It is illustrated in the accompanying drawings, and consists of the following parts—viz., a lever, pawl and ratchet, chain, and cam, combined and co-operating with the axle and draw-bar, as hereinafter set forth.

A is the car-frame, having the usual draw-bar and sleeve B $a$. C is the axle, to which the wheels $c$ are rigidly attached, and which carries a ratchet-wheel, $b$, securely keyed midway between the wheels.

D is a lever, having cheek-pieces $d'$ on each side of the ratchet-wheel, whereby it is pivoted upon the axle. E is a pawl which slides longitudinally in the lever D, being normally pressed forward by a spring, G. The pawl E and lever D are slotted respectively at $f$ and $f'$, and a cam or lug, F, is secured to the car-frame in proper position to enter these slots as the lever is raised and retract the pawl.

A weight, $d$, or in lieu thereof a spring, is used to depress the lever D when the strain is relieved. A chain, $h$, connects the end of the lever with the draw-bar, being led over a pulley, $h'$, as shown. A plate, $f''$, covers the spring G and holds down the rear end of the pawl.

In operation, as strain is applied to the draw-bar B the rear end of the lever is lifted, and the pawl E, engaging with the ratchet $b$, causes the wheels to turn, starting the car. As the end of the lever approaches the pulley $h'$ the cam F enters the slots $f f'$ and retracts the pawl, thereby preventing the continuous clicking that would otherwise result.

By preference the cam F is connected with the brake-lever by any simple contrivance, so as to retract the pawl whenever the brakes are applied. It will be seen that the leverage upon the axle is immense, and a partial rotation of the wheels is enforced as tension is applied to the draw-bar.

What I claim is—

1. In combination with the lever D, having jaws $d'$, pawl E, and spring G, the ratchet $b$, cam F, and draw-bar, as set forth.

2. The lever D having weight $d$, and slotted pawl E, in combination with the ratchet $b$, chain $h$, cam F, and draw-bar, as set forth.

BENJAMIN G. FITZHUGH.

Witnesses:
R. D. WILLIAMS,
W. A. BERTRAM.